US006308867B1

(12) United States Patent
Wolter

(10) Patent No.: US 6,308,867 B1
(45) Date of Patent: Oct. 30, 2001

(54) MEDIA DISPENSER

(75) Inventor: Michael Wolter, Taegerwilen (CH)

(73) Assignee: Ing. Erich Pfeiffer GmbH, Radolfzell (DE)

(*) Notice: Subject to any disclaimer, the term of this patent is extended or adjusted under 35 U.S.C. 154(b) by 0 days.

(21) Appl. No.: 09/387,124

(22) Filed: Aug. 31, 1999

(30) Foreign Application Priority Data

Sep. 7, 1998 (DE) ............................................. 198 40 723

(51) Int. Cl.[7] ...................................................... G01F 11/00

(52) U.S. Cl. .................................... 222/321.6; 222/321.7; 222/420; 222/422

(58) Field of Search .......................... 22/420, 422, 321.6, 22/321.7, 380, 340

(56) References Cited

U.S. PATENT DOCUMENTS

| | | | | |
|---|---|---|---|---|
| 1,002,995 | * | 9/1911 | Johnson | 222/422 |
| 2,281,051 | * | 4/1942 | Roger | 222/422 |
| 2,832,513 | * | 4/1958 | Tubin | 222/422 |
| 3,107,035 | | 10/1963 | Cholet | 222/213 |
| 4,770,323 | | 9/1988 | Debard . | |
| 4,830,284 | * | 5/1989 | Maerte | 239/333 |
| 5,147,073 | | 9/1992 | Cater . | |
| 5,725,131 | | 3/1998 | Bell et al. . | |
| 5,785,208 | | 7/1998 | Dobbs et al. . | |

FOREIGN PATENT DOCUMENTS

| | | |
|---|---|---|
| 35 03 354 A1 | 1/1985 | (DE) . |
| 196 27 228 A1 | 7/1996 | (DE) . |

OTHER PUBLICATIONS

German Patent Office search report on European patent application No. 19840723.8, dated Apr. 20, 1999.

* cited by examiner

*Primary Examiner*—Kevin Shaver
*Assistant Examiner*—Stephanie Willatt
(74) *Attorney, Agent, or Firm*—Quarles & Brady LLP

(57) ABSTRACT

The dispenser outlet (13) is microbiologically sealingly closeable by a valve stopple (25) which closes counter flow direction (11). Outlet 13 is manually reversely opened prior to the pump stroke against a spring (34). The medium reaches outlet (13) via throttles (22, 21, 49). Thus the medium creeps practically non-pressurized to an adhering face (51) of a droplet former (50). There the medium accumulates to a droplet suspending in the upside-down position. The medium contained in the dispenser (1) is effectively protected from germ contamination and the droplet may be simply administered to an eye or the like.

29 Claims, 4 Drawing Sheets

MEDIA DISPENSER

TECHNICAL FIELD AND BACKGROUND OF THE INVENTION

The invention relates to a dispenser for releasing flowable media by pressurizing. Particularly liquid media, but also pasty, powdery and/or gaseous media are suitable. The dispenser is held and simultaneously actuated for discharge single-handedly. Most or all parts are injection molded from plastics. The medium may be discharged atomized or delivered in discrete clusters or droplets of a colume of at least 5 or 15 $\mu$l and at the most 40 or 25 $\mu$l while containing medical active substances for eye treatment, or the like.

Such dispensers need microbiological sealing to prevent the stored medium from germ contamination gaining access from without. The medium is to be protected from such detrimental effects during a long shelf life not only prior to the dispensers first-time use (priming) but also after the initial discharge. The dispenser may be made for a single dose discharge or for moving the actuator only unidirectional without return or suction stroke up to being totally emptied. The total input of medium may be in a single conveying chamber right from the start without provision of any additional medium reservoir. The chamber volume is then variable for pressurized medium delivery. However, the dispenser or its actuator may also operate reversible, namely repeatedly via a working stroke for pressurized delivery directly followed by a return stroke for sucking a further medium dose into the chamber. After discharge of the medium dose the microbiological seal is always to be reproduced until the next discharge. This is not necessary in the case of a disposable dispenser.

For this seal either a single valve or several valves may be suitable. The valves closing gaps sequentially follow within the outlet duct in the flow direction. The last downstream valve is as near as possible to the medium outlet or its bound which is formed by the transition between an inner circumference and a transversely adjoining end face. At this transition the medium detaches from all inner circumferences or inner dispenser surfaces for release to the environment. Downstream thereof the medium may be still guided on external dispenser faces.

OBJECTS OF THE INVENTION

An object of the invention is to provide a dispenser which avoids the drawbacks of known configurations and achieves advantgeous effects of the aforementioned kind. Another object is to ensure a repeated microbiological seal against germ ingress through the bounds of the outlet or of inflow openings. Other objects are simple handling or uncomplicated construction. A further object is to provide a dispenser for modular composition permitting adaptation to media differing in flowability.

SUMMARY OF THE INVENTION

According to the invention the dispenser comprises a valve closing with high surface pressure. Its closing gap may also form the named opening bound. Thus the closing gap extends up to the outermost possible location of the outlet duct at which the medium detaches. With the valve closed this location is a microbiological seal. Thus, at the most, germs are able to collect on the permanently freely accessible dispenser outside but have no upstream access to internal dispenser faces past the tight closing gap.

The closing force is not reduced until the medium pressure in the outlet duct has attained at least 0.7 or 1 or 1.4 bar.

The valve could be opened by fluid control once the medium pressure has attained this value. Otherwise it is opened pressure independedly by pure mechanical actuation. The cited sealing effect and the germ ingress prevention with the valve open may also be improved by keeping the valves operating travel smallest. The maximum relative opening or closing travel of the two valve bodies is less than 2 mm, 1 mm, 0.7 mm or 0.4 mm, e.g. 0.3 mm. On droplet discharge the medium then emerges practically with zero pressure or by capillary creeping through the valve gap. Still further upstream means such as a pump for generating a medium pressure higher than the aforementioned pressures, i.e. two to five times higher, may be provided. This medium pressure amounts to e.g. at least 4, 6 or 7 bar.

To nevertheless attain a medium discharge at the outlet under reduced or without pressure, a throttle gap adjoines the valve upstream. This gaps passage cross-section is significantly smaller than that of the opened valve and may be varied as a function of the medium pressure. For example, the open valve cross-section may be at least 2, 40 or 50 times more than the throttle cross-section.

Upstream of the end valve or throttle gap a further valve or throttle is provided in the outlet duct. E.g. the medium flow is prethrottled in constant cross-sections already upstream of the throttle gap or end valve. The flow of the medium is also throttled at the transition from the converging chamber to the outlet duct or shut off microbiologically sealed at this transition. The further valve is a spring-loaded outlet or pressure relief valve. For forming the closing gap the closing faces of each of the valves may have only linear contact or maximum closing pressure along a sole e.g. annular micro line for maximum specific areal pressures. Therefore one of the closing faces of each valve is a sharp edge bounded by two angularly adjoining flanks or a spherical surface.

The medium is manually conveyed by a thrust piston pump or a flexible squeeze receptacle, such as a tube. In the latter the dispensers complete valve control is arranged in the constricted tube tip which is in one part with the tube shell. In the case of a piston pump the cylinder or piston runs commonly with the medium outlet counter the opening direction of the movable valve bodies during the pump stroke.

Irrespective of the described constructions a droplet former, particularly in the upside-down position of the dispenser with the medium outlet held downwards, accumulates a freely exposed medium droplet of a metered volume. The droplet then hangs adheringly suspended on the dispenser with a transition diameter smaller than its largest diameter. Thus the droplet does not detach until its lower end face comes into contact with a counter face, e.g. the eyeball. With this the droplet commences to flow onto the counter face. For the droplet the accumulator has a convex and/or concave adhering face which may be spherical, smooth or polygonal to increase the areal size at a same plan view area. This face directly adjoins the end valves closing faces and is formed by the end of a needle traversing the medium outlet.

DESCRIPTION OF THE DRAWINGS

Example embodiments of the invention are explained in more detail in the following and illustrated in the drawings in which.

DETAILED DESCRIPTION

Figure 1:
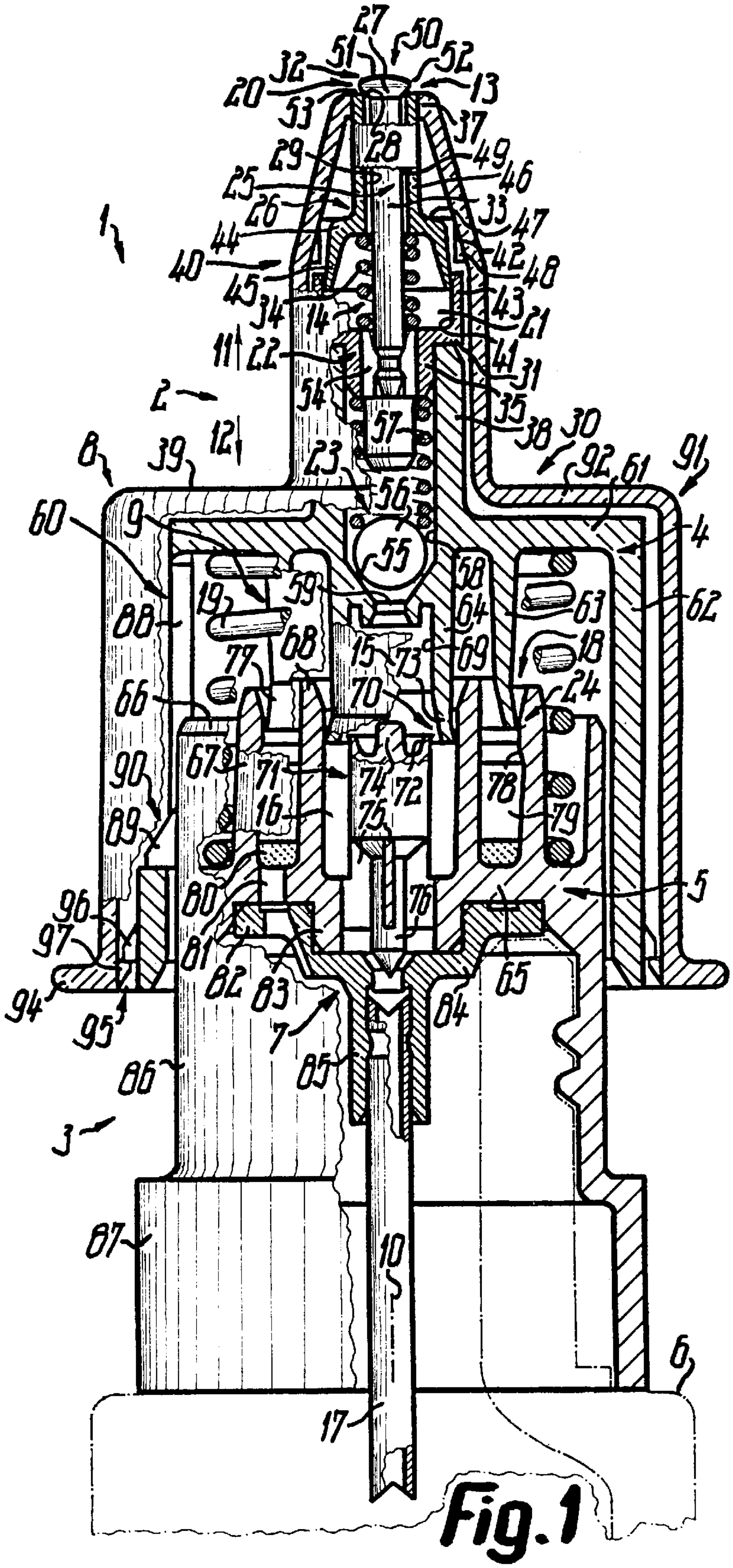
FIG. 1 is the dispenser in partly sectinoal side view and in initial or rest position.

The dispenser 1 has two units 2, 3 with one-part base bodies 4, 5. Mutual displacement results in shortening or lengthening the dispenser 1. Support body 5 is sealingly secured by a flange 7 to the bottleneck of a reservoir 6, e.g. a bottle of glass or the like. Units 2, 4 and 3, 5 form a pump 9 with a manual actuator 8. All parts are located in axis 10. On discharge, the medium flows parallel to axis 10 in direction 11 from unit 3 through unit 2 out of medium outlet 13. Unit 2 and outlet 13 are thereby commonly displaced in the opposite direction 12 and relative to unit 3.

The axis of outlet 13 may be perpendicular to axis 10. Outlet 13 is the end of outlet duct 14 traversing only unit 2. The upstream end of duct 14 directly connects to conveying chamber 15 which is volumetrically variably bounded by bodies 4, 5. Upstream chamber 15 adjoins valveless a pre- or presuction chamber 16 supplied valveless with medium via a riser duct 17 from the bottom of reservoir 6. Corresponding to its emptying reservoir 6 receives an atmospheric air flow from without on each working stroke via a vent 18 which is bounded by bodies 4, 5. The return or down-stroke of units 2, 3 to the dispensers longer rest position is powered by a spring 19 directly supported on bodies 4, 5 as a permanently pretensioned helical compression spring.

In flowing from chamber 15 up to and out of outlet 13 the medium is sequentially and separately controlled by passages 20 to 23, such as chambers, throttles and valves located in this numerical and actual sequence from the vicinity of outlet 13 upstream up to the end of chamber 15. Each control passage 20 to 23 formes a separate length section of duct 14. Vent 18 is controlled via valve 24. Control valve 20 has two separate nested valve bodies 25, 26 each in one part. The valves closing faces 27, 28 bound outlet 13. At outlet 13 the medium detaches from the dispenser 1 into the atmosphere or it remains attached to only one integral, freely accessible outer surface of the dispenser 1. The outer, annular closing face 28 is conically widened in direction 11 and is the end of an integrally bounded nozzle bore 29 of unit 2. The inner complementary annular or conical closing face 27 is formed by pinshaped body 25. For opening face 28 is moved by a control 30 in direction 12 before the medium pressure is increased in chamber 15 and in duct 14 and before valve 23 is opened.

Control 30 includes a one-part piston 31 with a cylindrical lip 43 freely protruding from a piston crown in direction 11.

Fixedly anchored in the crown is the upstream end of body 25. Duct 14 and the rotationally symmetrical stem 33 of body 25 traverse the crown where they commonly bound duct 14. At the downstream end of body 25 the stem 33 has a widened head 32 forming face 27 which adjoines the outer circumference of stem 33. Body 25 is loaded toward the closed position by a permanently pretensioned spring 34 which directly adjoines the crown downstream and within duct 14 surroundes only stem 33 as a helical compression spring. In each position body 25 is made fast on bodies 4, 31 by a collar sleeve 35. Support 35 belongs to piston 31 and juts from its crown in direction 12. Within support 35 the upstream end of stem 33 is made fast, e.g. by a resilient snap connector.

Cap-shaped valve body 26 is fixedly seated in a shell or shield 36 which is up to twice as long as its outer diameter. Shell 36 transits in one part into an end wall 37. Wall 37 is traversed by duct 29, outlet 13 and a passage for body 26. A sleeve or lug 38 of body 4 engages displaceably the upstream, cylindrical and widened end of shell 36 in direction 11. Shell 35 fixedly engages inside lug 38. The piston crown rests on the end face of sleeve 38. Shell 36 extends up to a handle 39 of actuator 8. Shell 36 and handle 39 are in one part.

Shell 36 of unit 2 forms in axis 10 or parallel thereto a stud-shaped discharge head 40 continually tapered in direction 11 up to its end and also suitable for being introduced into a bodily aperture such as a nostril. The cylindrical inner circumference of shell 36 may form a sealing running face or a radial support for lip 43 of piston 31. The inner circumference of piston 31 bounds duct 14. Downstream thereof the same inner circumference forms a conical face 42 surrounding an annular throttle body or piston 44. Lip or guide member 45 of piston 44 protrudes in direction 12 into piston 31, slides sealingly on the inner circumference 41 of lip 43 and bounds duct 14 by its inner circumference. Throttle 22 connects upstream directly to those duct sections which are bounded by lips 43, 45. Throttle 22 is located in sleeve 35 and bounded by stem 33. The outer circumferences of piston lips 43, 45 and of lug 38 bound an annular dry space of shell 36 which is permanently without medium contact. Lips 43, 45 bound the widened, but volumetrically variable chamber 21 provided for mollifying the flow directly following throttle 22.

A piston or throttle body 46 downstream directly juxtaposes chamber 21 inside shell 36 and surrounds stem 33. Shell 46 freely protrudes in direction 11 from the crown of piston 44. Sleeve 46 has the bore 29 and bounds the annular throttle gap 49 commonly with the outer circumference of stem 33. In direction 11 the crown of piston 44 is put against a stop 47, e.g. ribs of shell 37, which adjoin sleeve 46. A corresponding stop 48 may also be provided for the end of lip 43. Spring 34 directly supports on the two crowns of pistons 31, 44 and is surrounded by sleeves 43, 45. The annular gap 49 of duct 14 is multiply longer than its diameter and sealingly closed only at face 28. Spring 34 urges face 28 and shell 37 in direction 11 permanently against face 27 with no self-locking effect. With valve 20 closed the nozzle duct 49 is also bounded by part of face 27 due to it being longer than seat 28. Sleeve 46 is slimmer than lips 43, 45 and sealingly supports against the inner circumference of the wall 37.

A protuberance or droplet former 50 is permanently freely accessible on the dispensers outside and communicates with orifice 13. Former 50 is provided by head 32 and, possibly, by adjoining sections of planar end face 53 of sleeve 46. The freely exposed end face 51 of head 32 is spherically curved or hemispherical. Face 51 directly adjoines by an annular edge 52 the widest zone of end face 27. With valve 20 closed the edge 52 is located apart from face 53 of wall 37 or from the ring edge of seat 28 flanked by face 53. Edge 52 is acutely and ring edge is obtusely flanked in axial cross-section.

In the vicinity of the crown of piston 31 throttle ducts 54 of throttle 22 are permanently permeable. Ducks 54 are longitudinal grooves in the plunger crown and in sleeve 35. The common passage cross-section of ducts 54 is significantly smaller than that of chamber 15 or valve 23 up to sleeve 35 and that of chamber 21, but greater than that of duct 49 and that which exists between faces 27, 28 when valve 20 is open. These longitudinal grooves are bounded by ribs which form the snap members for holding body 25.

Outlet valve 23 of the pump chamber 15 has an acutely concial valve seat 55 on body 4 and a ball 56 with a spherical counter face of plastics, metal or the like. Valve body 56 is loaded in direction 12 against annular or linear contact with valve body 55 by a permanently pretensioned spring 57. Helical compression spring 57 directly contacts bodies 35, 56. Spring 37 is centered on a mandrel which freely protrudes in direction 12 and belongs to seal 35. This mandrel limits the opening path of element 56 by abutment. From valve 23 up to body 35 the duct 14 is bounded constantly wide by lug 38 or the inner circumference 58 thereof. Face 58 is provided with longitudinal or control grooves (FIG. 2) spaced from the valve seat in direction 11. On a first opening path of element 56 only a very small passage cross-section is free. Over the subsequent opening path up to the stop on body 35 a correspondingly greater cross-section is freed. A valve inlet 59 connects upstream to the closing seat of valve 23. Inlet 59 is more constricted than this seat and chamber 15. Inlet 59 is formed by a lug of body 4. This lug freely protrudes in direction 12 into chamber 15.

Bodies 4, 5 form a housing 60 extending from an end wall 61 of body 5 in direction 12 up to the upstream end of body 5. Only lug 38, body 26 and head 40 freely protrude beyond wall 61 in direction 11. The outer surfaces of head 40 are freely accessible. An end face of wall 61 forms a stop for delayed driving by handle 39. Beyond the outer end face commonly one-part shells 62 to 64 of body 4 protrude only in direction 12. Lug 38 protrudes only in direction 11. Body 5 likewise has an endwall 65 spaced from its ends. Annular wall 65 is permanently located within body 4. Body 5 has shells 66 to 68 freely protruding in direction 11 and commonly in one-part. Outermost and longest shell 62 permanently surrounds all remaining walls 63 to 68 and radially commonly boarders with the outer circumference of wall 61. The next or middle shell 63 is radially spacedly located within shell 62 and its outer circumference directly opposes the inner circumference of shell 67. This outer circumference has an end lip sealingly engaging the inner circumference in the rest position.

Shells 66, 67 are located permanently between shells 62, 63. Innermost shell 64 is radially spaced from and located within shell 63 as well as within inner shell 68. Shell 67 has the same radial spacings from shells 66, 68. Each of the upstream free ends of shells 63, 64 forms an annular piston lip which is acutely widened in direction 12. The inner circumference of pressurizing cylinder 64 bounds chamber 15 with a cylindrical running face or boundary 69. The upstream end of boundary 69 is acutely conically widened in direction 12 to form a closing face of flow control means a closure or an inlet valve 70. Within shell 68 a piston 71 of body 5 permanently freely protrudes from wall 65 into shell 64. Piston 71 has at its downstream end an annular lip 72 or valve element of valve 70. In rest position face 69 and lip 72 bound an annular inlet gap. This gap sealingly closes after an initial smaller stroke path by the lip 72 running onto the slanting end of face 69. Chamber 16 connects upstream to this gap. Chamber 16 is bounded by lugs 68, 71 and by end lip 73 of shell 64. Lip 73 slides permanently sealed on the inner circumference of shell 68.

With radially spacing within lip 72 the plunger 71 has a projecture or mandrel 76. At the end of the pump or up-stroke lug 76 sealingly or permeably engages inlet 59 and mechanically lifts valve body 56 from seat 55 only so far that the valve passage is not freed over its maximum cross-section. The lug of inlet 59 then engages the annular groove between projections 72, 74 and lip 72 abuts on the bottom of the annular groove which surrounds this projection. Connectors or ribs 75 of body 5 adjoin the upstream end of piston 71. This end is conically tapered. Ribs 75 extend from the conical intermediate section of piston 71 and from within chamber 16 upstream only over part of the thickness of wall 65 as well as of the length of slimmer mandrel 76 of piston 71. Thus wall 65 is centrally penetrated by an annular duct which is circumferentially subdivided by ribs 75. At the end of the up-stroke lip 73 can abut on the bottom of chamber 16 or on wall 65 while receiving those sections of parts 75, 76 which protrude over wall 65.

Conically widened end lip 77 of shell 63 is set back in direction 11 relative to lip 73. After a first short partial stroke of the working or up-stroke lip 77 slides over a control face or step 78 of the inner circumference of shell 67. Thus valve 24 is opened on closing valve 70. Commonly shells 67, 68 and 63, 64 bound an annular chamber 79. Air flows or is sucked into chamber 79, while inflowing between shells 62, 66, 63, 67. Bottom 65 of chamber 79 is traversed by a vent duct 81. Duct 81 is totally covered by a germicidial filter 80 which is annular about axis 10 and located in chamber 79. Disk-shaped filter 80 contacts shells 67, 68 with radial pressure and also contacts bottom 65. At the stroke end filter 80 may be reached or crushed out by valve body 73. Spring 19 surrounds parts 63, 64, 67, 68, 80. Spring 19 is located in the annular chamber which is directly bounded between and by shells 62, 63, 66, 67. Spring 19 is directly supported on walls 61, 65.

One-part flange 7 forms an annular disk-shaped seal 82 which engages without radial motion play or at its outer and inner circumferences with radial pressure into an annular groove of wall 65. This groove is remote from member 80. Member 82 has an annular groove on its downstream end face. Commonly with wall 65 this groove communicates with duct 81 and bounds an annular duct which continuously extends around axis 10. A cap 84 of flange 7 connects to the inner circumference of seal 82 and protrudes in direction 12. A sleeve-shaped lug 83 of body 5 engages inside cap 84 and protrudes from wall 65. A passage connects to the bottom of the annular groove and is in line with passage 81. The connecting passage traverses seal 82 and is continued as an inclined groove in the outer circumference of the shell of cap 84. The free end of mandrel 76 which protrudes beyond ribs 75 in direction 12 is conical or pointed tapered. This end engages with radial spacing a conical bore which is provided in the bottom of cap 84. Thus an annular inlet opening is bounded and widened as a hollow cone in direction 11. The passage cross-sections of this opening are significantly smaller than those in the region of ribs 75 or of chambers 15, 16. A connecting member or sleeve 85 of flange 7 protrudes from the end wall of cap 84 solely in direction 12 to provide a mount or shaft into which the riser tube 17 is inserted.

Together with wall 65 and upstream thereof body 5 forms a connector or cap 86 for engaging the reservoir neck. The necks annular end face and/or the necks annular opening edge which is set back from this end face rests fixedly against seal 82 and the outer circumference of cap 84 with axial respective radial pressure. The inner circumference of cap 86 is provided with a fastener or tensioning member, such as a thread. This fastener engages a corresponding counter member on the necks outer circumference. The end of shell 86, 87 abuts against an annular shoulder of reservoir 6. This shoulder is formed by the transition between bulge and neck of reservoir 6. At the end of the up-stroke body 4 or shell 62 do not reach the annular shoulder of shell 87.

Securing means 90 prevent units 2, 3 and bodies 4, 5 from being mutually rotated or withdrawn. Shell 62 has a slot 88 adjoining wall 61. The end of slot 88 is offset in direction 11 relative to the free end of shell 62. Cam 89 engages slot 88 and projects from the outer circumference of shell 66. In rest position the radially freely protruding cam 89 abuts against the slot end in the plane of the downstream end face of wall 65. Body 4 is mounted on body 5 in direction 12. Thereby cam 89 resiliently widens shell 62 by an inclined face until cam 89 snaps into slot 88, namely after walls 62 to 69 have mutually over- and interengaged. Bodies 25, 31, 56, 57 are inserted in body 4 in direction 12. Body 40 is slipped on body 4 in direction 12. Bodies 31, 34, 44 and, in case, 31 are previously inserted in body 40 in direction 11. Before or thereafter body 25 is inserted into bodies 4, 40 in direction 12 and the fixed connection with piston 31 is made. The free end of shell 63 is set back relative to the free ends of shells 62, 64. The free end 73 of shell 64 is set back relative to that of shell 62. The free ends of shells 66, 67 are set back relative to that of shell 68. Shell 66 is set back relative to shell 67. Relative to the free ends of shells 66 to 68 the piston 71 is set back. Body 56 is located in the plane of wall 61. Bodies 43, 44 are located totally outside of body 4 and permanently spaced from body 4 in direction 11.

Housing 60 is covered by an overcap 91 permanently totally accomodating body 4. The annular disk or end wall 92 of cap 91 adjoins in one part the upstream end of shell 36. With radial spacing therefrom the outer circumference of wall 92 translates into cap shell 93 which protrudes only in direction 12. At its upstream end shell 93 has an annular collar 94 which protrudes beyond the outer circumference of shell 93. The outer end face of wall 92 forms on both sides of head 40 pressure faces of handle 39 for simultaneously supporting fingers of the single users hand. In the rest position the inside of wall 92 is spaced from the outside of wall 61. This spacing corresponds to that of lip 43 from stop 48. Thus by pressing handle 39 the cap 91 or shell 36 can be displaced in direction 12 synchroniously with valve body 26 and relative to bodies 4, 5 by this spacing over an idle travel against the force of spring 34 and without loading spring 19. Thus seat 28 is lifted from closing face 27 and valve 20 or outlet 13 is opened. After abutment body 4 is synchroneously driven commonly with and by body 91 relative to body 5, whereby valve 20 invariably remains open. A lock 95 positively locks cap 91 relative to housing 60 or body 4 and prevents withdrawal in direction 11. Cap 91 and valve body 26 may be commonly rotatable about axis 10 relative to body 4 or prevented from such rotation by lock 95. Lock 95 has a protruding cam 95 on the outer circumference of shell 62. Counter cam 97 on the inner circumference of shell 93 abuts on cam 96 by the force of spring 34. Cam 97 is located in the plane of collar 94 at the open end of shell 93. By displacing cap 91 cam 97 is lifted from cams 96. Then shell 93 protrudes beyond shell 62 in direction 12. Through the gap between walls 62, 93 or 61, 92 or 36, 38, 43 the said dry space is permanently aerated and de-aerated about lips 43, 45 up to wall 37.

For the up-stroke handle 39 is pressed on both sides of head 40 by two handfingers and cap 91 inclusive wall 37 and control body 26 is displaced in direction 12 by the cited idle or stop travel against spring 34 and relative to unit 3 or body 4. After less than a one millimeter stroke valve 20 is fully open by stop limiting and inlet valve 70 is closed. At this valve opening stroke lip 45 slides sealingly on face 41, thus constricting chamber 21 like a pump chamber, pressurizing the medium contained therein and slowly pressing it into gap 49. Simultaneously the sealing pressure of lip 45 increases by this medium pressure. Thereby chambers 15, 16 are totally filled with the medium. Directly thereafter valve 24 opens and any vacuum in reservoir 6 is compensated. At further stroke the pressure increases in chamber 15 until before the work stroke end the opening pressure of valve 23 is reached or until cam 74 reaches body 56. Thus body 56 opens in direction 11 at seat 55 against the force of spring 57 either to the cited smaller passage cross-section or subsequently to the passage cross-section of the rib ducts. The medium thus gains access to duct 14 under the pressure in chamber 15, flows through body 31 and throttle 22 into chamber 21 where after the flow acceleration in throttle 22 flow calming and deceleration occurs. The opening stroke of parts 26, 44, 91 amounts to but 0.3 mm for a maximum diameter of the opening 13 or 28 of 5 mm, 4 mm or 2 mm.

From calming chamber 21 the medium flows directly into duct 49. Boundaries 33, 46 of duct 49 thereby remain dimensionally rigid. The width of gap 49 of maximally three or two tenths of a millimeter is at least 10- or 20-fold smaller than the axial stroke of the closing face 28, e.g. between 0.005 and 0.01 mm. Thereby the pressure in chamber 15 may be at 7 bar to 8 bar. The medium flows very slowly in duct 49 along stem 33 and between the separated faces 27, 28. The medium creeps over edge 52 onto face 51 where it accumulates to an adhered droplet of 20 $\mu$l. In the upside-down position of the dispenser 1 and in all valve positions this droplet is then freely suspended only from face 51. Piston 44 is permanently stationary relative to housing 36, 37.

When pressure drops in chamber 15 at the end of the stroke of pump 9, spring 57 closes valve 23 which may first close the passages of the cited rib ducts and limit the valve passage to the more constricted passage cross-section before then sealingly resting at seat 55. Thus reflowing of the medium from chamber 15 into duct 14 is temporarily possible. As soon as handle 39 is released spring 34 closes valve 20. Thereby spring 34 pulls valve body 25 over the cited stroke into seat 28. Thus the space between faces 28 and 55 remains either totally filled with medium or is at least partly emptied. Thus after first operation (priming) duct 14 always remains totally filled with medium. While valve 20 is closed, firstly piston 31 lifts off from stop 48 which limits the cited stroke resiliently yieldable or rigid. At the end of the down-stroke spring 19 opens valve 70. Thus the medium which had been sucked into chamber 16 during the down-stroke by piston 73 flows abruptly into evacuated chamber 15. Simultaneously medium is resucked through conduit 17 into chamber 16. Thereby the medium flows around parts 76, 75, 71. In rest position chambers 15, 16 permanently communicate due to valve 70 being open. Shortly before the down-stroke end, valve 24 of chamber 79 also closes. Air had flown from chamber 79 through flange 7 into reservoir 6 while mortifying any germs by filter 80.

Duct 17 and lug 85 may also be eliminated. Then only in upside-down position pump 9 will suck medium from reservoir 6 through flange 7, since then the medium flows by gravity up to and into chambers 15, 16.

Figure 2:
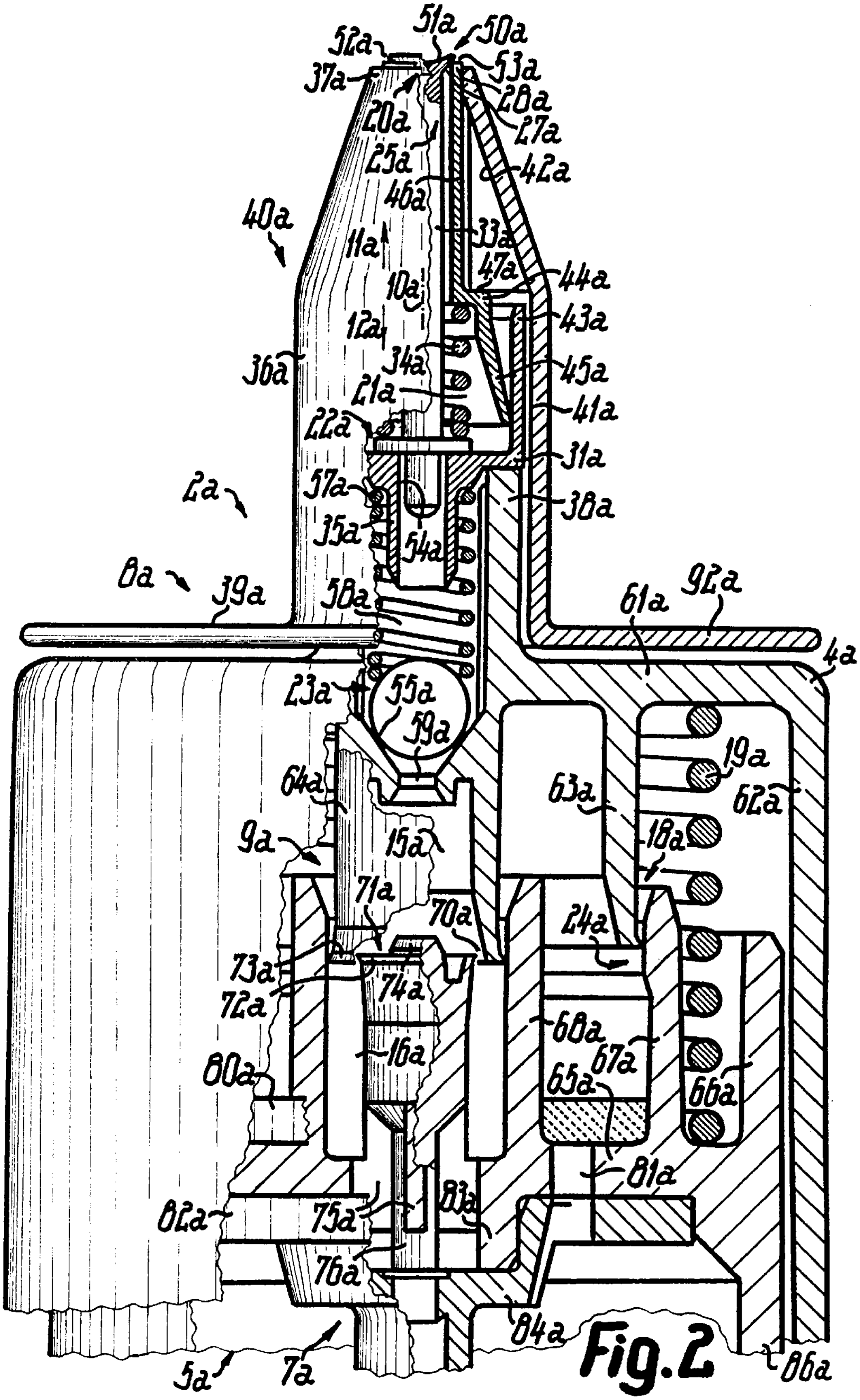
FIG. 2 is a sector of a further dispenser.
Figure 3:
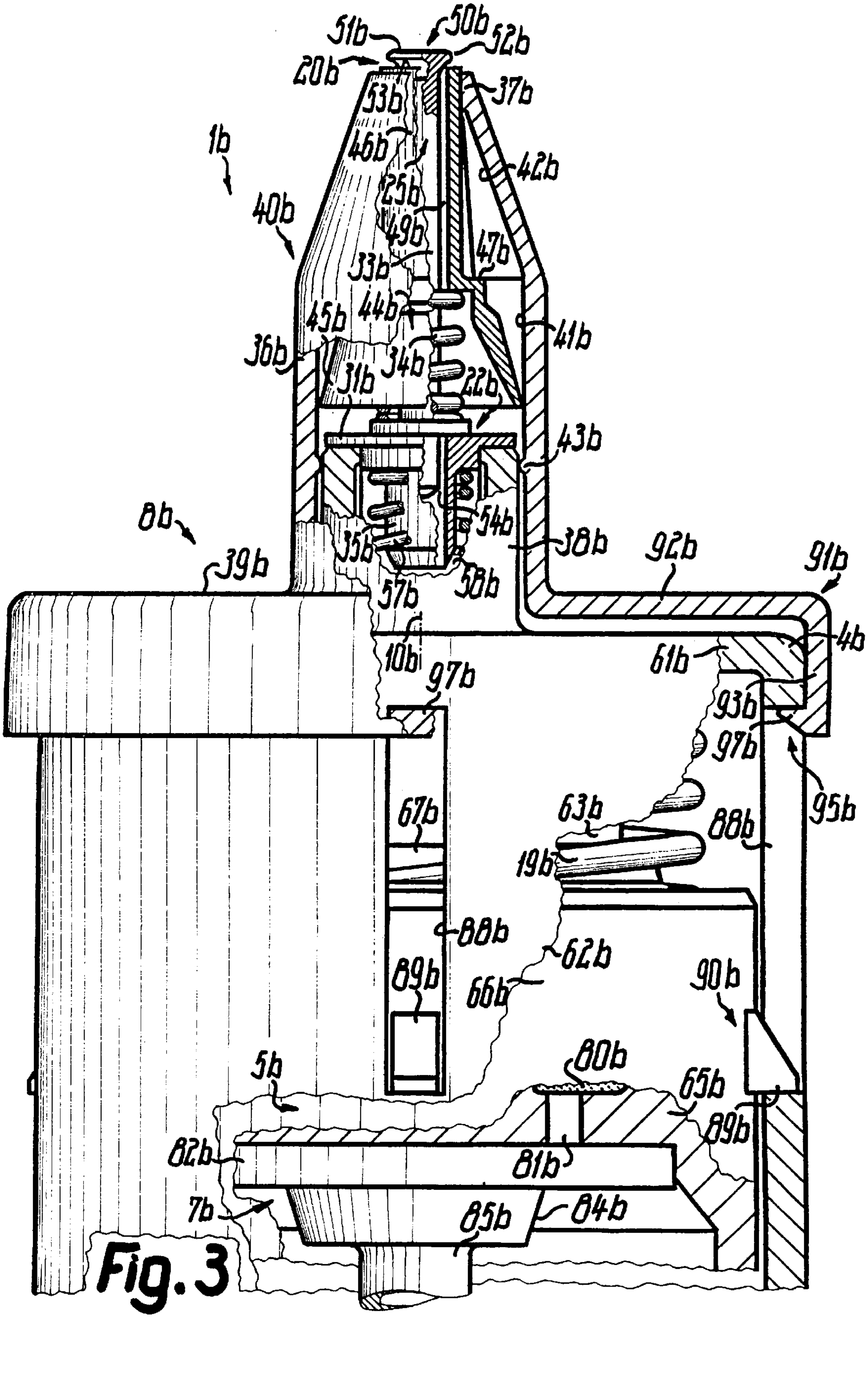
FIG. 3 is a still further dispenser shown as in FIG. 1.
Figure 4:
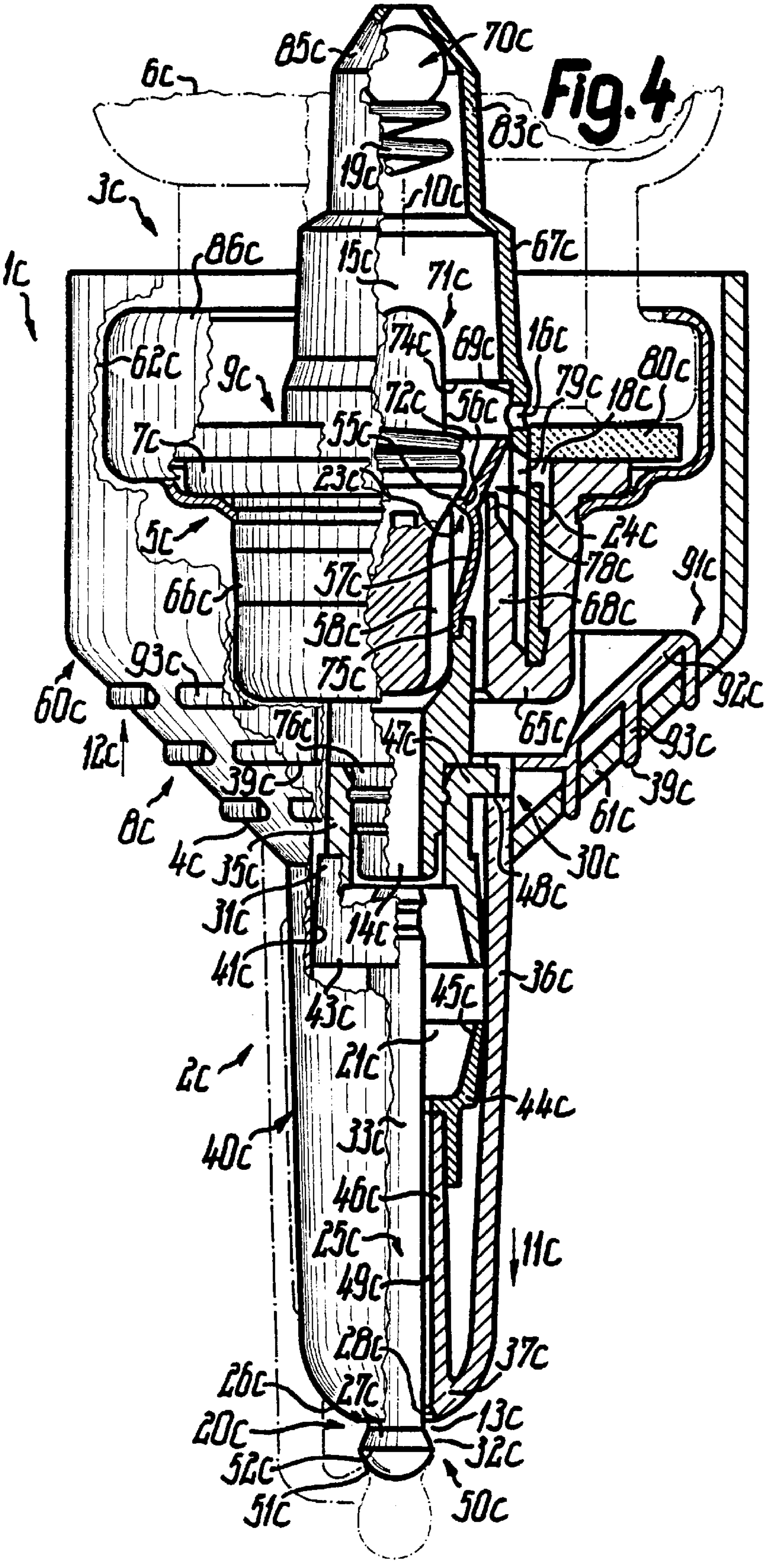
FIG. 4 is another dispenser with the valve open, on commencement of the pump stroke and in the upside-down position.

In FIGS. 2 to 4 like parts have like reference numerals as in FIG. 1 but indexed differently. All passages of the description apply accordingly to all embodiments. All features of each embodiment may be provided on the other embodiments in addition and/or in combination.

FIG. 2 illustrates instead of throttle 22 a valve 22*a* which opens against the force of spring 34*a* upon overpressure in duct 58*a*. When the overpressure drops, spring 34*a* closes valve 22*a*. The valve bodies 25*a*, 31*a* are mutually movable. The crown inside of piston 31*a* forms the valve seat. A collar protrudes beyond the outer circumference of stem 33*a*, forms the movable valve body and directly supports the upstream end of spring 34*a*. This collar is an annular disk having a planar end face. Upstream beyond this valve body or its closing face stem 33*a* protrudes by a mandrel into sleeve 35*a*. This mandrel and the inner circumference of sleeve 35*a* commonly bound the annular throttle duct 54*a*. Sleeve 35*a* is radially spaced from the inner circumference of duct 58*a*. Thus sleeve 35*a* extends into and centers spring 57*a*. On the opening stroke for valve 20*a* spring 34*a* is further pretensioned. Then begins the pump stroke of pump 9*a* until firstly valve 23*a* and thereafter pressure relief valve 22*a* opens to let the medium flow directly into chamber 21*a*. In rest position the piston shell 45*a* is located almost totally in piston lip 43*a*.

In rest position the end face 53*a* is not coplanar with the outer end face of wall 37*a,* as is the case in FIG. 1. Face 53*a* protrudes over wall 37*a* by a fraction of a millimeter. End face 51*a* is entirely and up to edge 52*a* arcuated or recessed to form a flat tray. Thus liquid conveniently creeps from face 59*a* to face 51*a* where it attaches as a suspended droplet. Shell 36*a* only adjoins end wall 92*a* which is entirely parallel to wall 61 and provides a freely exposed annular edge at the outer circumference. The outer diameter of this edge corresponds to the outer diameter of shell 62*a* which is permanently freely exposed over its full length. Mandrel 76*a* has no pointed tip. Instead mandrel 76*a* has an entirely planar end face which is coplanar with the inner face of the bottom of cap 84*a*. This inner face has a recess which is wider than mandrel 76*a*. From the recess bottom the constricted passage emanates. Thus the medium perpendicularly impacts the end face of mandrel 76*a* in direction 11*a,* flows transversely against the circumference of the recess and then again perpendicularly in direction 11*a* into chamber 16*a,* 15*a*.

FIG. 3 illustrates lip 45*b* sealingly directly guided by the cylindrical inner circumference 41*b* of shell 36*b*. Body 31*b* is thus permanently spacedly out of contact with body 44*b* and has no lip but only a widened collar which provides an end wall corresponding to the plunger crown of FIG. 1. In FIGS. 2 and 3 the rib ducts or longitudinal grooves on the inner circumference of duct 58*a* or 58*b* are apparent and also extend over a length part of sleeve 35*a* or 35*b*. Instead of the seal between lips 43, 45 in FIG. 1, the seal is provided directly between shells 36*b,* 38*b*. The inner circumference of shell 36*b* has an annularly protruding seal bead 43*b* which sealingly slides on the outer circumference of lug 38*b*. End face 51*b* is entirely planar up to edge 52*b*. As in FIG. 2 spring 34*b* is supported on the end side of the movable valve disk of valve 22*b*. Valve 20*b* is opened to a first width by the stop limited idle stroke of handle 39*b* relative to body 4*b*. By opening valve 22*b,* valve 20*b* subsequently opens to an even greater width. This second opening stroke may be significantly smaller than the first or idle stroke.

Shell 93*b* of body 91*b* extends only over part of the height of shell 62*b,* e.g. by only twice, three times or four times the thickness of wall 61*b*. Slots 88*b* are engaged by cams 89*b* and cams 97*b*. In rest position the stop face of cam 97*b,* which is remote from the stop face of cam 89*b,* is in contact with that end of slot 88*b* which is juxtaposed with wall 61*b*. In the up-stroke end position cams 89*b,* 97*b* are in contact or inter-spaced with their mutually opposed and inclined faces.

In FIG. 4 piston unit 71*c* is snugly fitted to unit 2*c* with a piston rod. A one-part and resiliently yieldable piston sleeve is fixed to the rod. The downstream end of the piston sleeve forms the axially joltable spring 57*c*. The other end forms lip 72*c* which is widened in direction 12*c*. Between its ends the piston sleeve forms annular valve body 56*c*. The valve seat 55*c* is formed by the piston rod. Outlet duct 14*c* and a core body traverse the piston sleeve. The core body has ducts 58*c* in the outer circumference. Sleeve 76*c* is fixed to the core body with a widened end 75*c* and protrudes in direction 11*c*. Sleeve 76*c* positionally secures the piston sleeve. A further sleeve 35*c* of seal 31*c* is fixed to sleeve 76*c*. Downstream end 43*c* of seal 31*c* sealingly slides on face 41*c*. Oppositely to seal 31*c* the end 45*c* of seal 44*c* fixedly and sealingly contacts the same face 41*c*. Piston 44*c* is fixedly and sealingly seated on the outer circumference of shell 46*c* by a sleeve which protrudes from its piston crown in direction 11*c*. This inner shell 46*c* is radially spaced from shell 36*c* and protrudes in one part from wall 37*c* in direction 12*c*. Piston 31*c* has at the upstream end of sleeve 35*c* a radially protruding cam 47*c* which engages axially shiftable in an opening of shell 36*c* while being prevented from relative rotation. This opening traverses the upstream end face of shell 36*c* and forms stop 48*c* by its closed end.

Shell 67*c* protrudes freely into reservoir 6*c* and bounds chamber 15*c*. Shell 67*c* has an inner shoulder 74*c* on which lip 72*c* abuts at the end of the up-stroke. Thus valve 23*c* is opened during the subsequent stroke travel. An annular cover is mounted in direction 12*c* on the end of shell 67*c*. This casing cover may also be in one part with shell 67*c* or body 5*c*. Shell 66*c* of this cover overengages in close contact the outside and shell 68*c* likewise overengages the inside of shell 67*c*. The open end of shell 67*c* is fixed between shells 65*c,* 66*c* by a snap lock. Flange 7*c* is in one part with the cover. The end of shell 68c forms valve body 78*c* and the conical outside of lip 72*c* forms the movable valve body of valve 24*c*. The cover is traversed by the piston rod. The piston sleeve is permanently located in the cover with the majority of its length. Sleeves 31*c,* 76*c* may commonly be in one part.

Valve 70*c* is located in the upstream end 85*c* of a constricted end section 83*c* of shell 67*c*. Pressure relief valve 70*c* has a valve ball corresponding to valve 23. This valve body is loaded by spring 19*c* toward the closed position. Spring 19*c* is located in chamber 15*c* and supported by the core body. Vent 18*c* is bounded between the casing cover and the piston sleeve. Downstream of valve 23*c* the vent traverses shell 67*c* outside of chamber 15*c*. Thus air flows therefrom through filter 80*c* into reservoir 6*c*. Filter 80*c* is also the reservoir seal which directly sealingly supports on flange 7*c* and shell 67*c*.

An inlet 16*c* from reservoir 6*c* to chamber 15*c* may also traverse wall 67*c* directly adjacent to seal 80*c*. The bound of inlet 16*c* forms with the boundary or lip 72*c* an inlet or slide valve. This valve is closed after a first stroke path and reopened towards the end of the down-stroke. Thus the reservoir 6*c* can be totally emptied. This valve and valve 70*c* are configured without a riser conduit 17 so that intake suction of the medium is only possible in the upside-down position. Instead of having an inlet opening shell 67*c* could also be sealingly closed at the upstream end.

Wall 61*c* is perpendicularly conically widened in direction 12*c*. Wall 61*c* directly slidingly adjoins the outer circumference of shell 36*c*. Handle 39*c* has protuberances or coaxial annular cams to prevent the user's fingers from slipping off. Shells 61*c,* 62*c* permanently envelope body 5*c* over the majority of its length so that only end 83*c* protrudes. A crimp ring 8*c* fastenes body 5*c*. Ring 8*c* is located within shell 62*c*. Ring 8*c* contacts flange 7*c* and a corresponding flange of the reservoir neck at remote end sides. Ring 8*c* internally receives seal 80*c*.

Body 91*c* is located mainly within cap 61*c,* 62*c*. Conical end wall 92 of body 91*c* is directly juxtaposed with the inside of wall 61*c*. Actuating members 93*c* protrude from wall 92*c* in direction 11*c*. Pins 93*c* traverse closely adapted openings in wall 61*c* and form handle 39 by their end edges at the outside of wall 61*c*. Projections 93*c* are distributed in several, e.g. three, coaxial annular zones and are, like the openings of wall 61*c,* circumferentially interrupted. The outermost pins 93*c* are directly juxtaposed with the inside of shell 62*c*. The innermost pins 93*c* are closely juxtaposed with shell 36*c* or with the inner circumference of wall 61*c*. The outer circumference of shell 36*c* is permanently slidingly mounted on this inner circumference or on the annular edge of wall 61*c*. When pressing handle 39*c* shell 36*c* follows commonly with piston 31*c,* 44*c* until the users fingers have attained the outer end side of wall 36*c* and until valve 20*c* is opened. Thereby either piston 72*c* may execute a partial stroke for partly or completely closing opening 16*c* or the cited idle travel is provided between shell 36*c* or stop 48*c* and cam 47*c*. After the opening stroke wall 61*c* and cam 93*c* commonly form handle 39*c* for implementing the pump stroke. The snap connector for shell 33*c* is provided within lip 43*c*.

The volume of the illustrated suspended 20 $\mu$l droplet is maximally three or two times larger or just as large as the volume of head 32*c* of stopple 25*c*. In FIG. 4 valve 20*c* is shown open and piston 72*c* is in rest position at the start of the pump stroke. Stops 47*c,* 48*c* have attained each other. FIG. 4 also indicates dot-dashed a protection cap for head 40*c*. This cap is in close or sealing contact with the out-sides of walls 36*c,* 37*c,* 61*c* and is to be withdrawn from dispenser 1*c* in direction 11*c*. At its end wall the cap has a projection which presses linearly pointwise or annularly against face 51*c* of body 25*c* in its closed position. All other portions of face 51*c* are free of contact. Thus the closing pressure between the closing faces of valve 20*c* is increased during shelf life of the dispenser. Face 51*c* is hemispherical and obtusely adjoins face 27*c* at sharp edge 52*c* in axial cross-section. Except for spring 19*c* the dispenser 1*c* requires no other spring since no spring is provided between bodies 31*c,* 44*c*. Spring 19*c* closes valve 20*c*.

Valve 20 or control 30 may be composed of maximally four injection molded plastic parts and spring 34. For instance, parts 31, 44, 57 or parts 31, 36, 38 may be commonly in one part. Without reservoir 6 the dispenser 1 may consist of seven or eight such injection molded parts to which three springs 19, 34, 57, body 56, filter 80 and, in case, riser tube 17 are added. Bodies 5, 7, 82 and bodies 4, 31 could be likewise commonly in one part. Each of the springs could also be made in one part with one or both of the components by which they are directly supported. All cited features and properties may be provided precisely as described, or merely substantially or approximately so and may also greatly deviate therefrom depending e.g. on the viscosity of the medium. The illustrated size relationships are particularly favorable, particularly when the length of the dispenser 1 as measured over bodies 4, 5, 40 is smaller than 10 cm or 7 cm and when its largest width is smaller, like smaller than 5 cm or 3 cm.

What is claimed is:

1. A dispenser for discharging media comprising:

a base body (4, 4*a,* 4*b,* 4*c*);

a discharge actuator (8, 8*a,* 8*b,* 8*c*) mounted on said base body;

an outlet duct (14, 14*c*) supplyable with the medium from a conveying chamber (15, 15*c*), said outlet duct (14, 14*c*) ending in a medium outlet (13, 13*c*) and defining an outlet flow direction (11, 11*c*), and valve means including a control valve (20, 20*c*) closing said cutlet passage (14, 14*c*) at closing faces (27, 28, 27*c,* 28*c*) which include a first closing face (27, 27*c*) and a second closing face, said control valve (20, 20*c*) including a first valve body (25, 25*c*) with said first closing face (27) and a second valve body (26, 26*c*) with said second closing face (28, 28*c*), said first valve body (25, 25*c*) assuming valve positions including a closed position, when in said closed position said first valve body (25, 25*c*) sealingly engaging said second closing face (28, 28*c*) under a closing stress and being liftable from said second closing face (28, 28*c*) to open said control valve (20, 20*c*), for opening said control valve (20, 20*c*) said first valve body (25, 25*c*) being displaceable relative to said second closing face (28, 28*c*) substantially co-directional with said outlet flow direction (11, 11*c*), wherein said second closing face (28, 28*c*) is dimensionally rigid when exerted to said closing stress, said second closing face (28, 28*c*) enveloping said first valve body (25, 26*c*).

2. The dispenser according to claim 1 and further including a closure (23, 23*c;* 70, 70*c*) varying flow of the medium, wherein control means (30, 30*c*) are included and operate to provide at least one of sequentially opening said control valve and said closure, or sequentially closing said control valve and said closure.

3. The dispenser according to claim 1, wherein means are included for pressurizing the medium above atmospheric pressure to achieve a medium pressure upstream of said control valve (20, 20*c*).

4. The dispenser according to claim 1, wherein both said first and second valve bodies (25, 25*c;* 26, 26*c*) are displaceable relative to said conveying chamber (15, 15*c*) in a direction (12) departing from said outlet flow direction (11, 11*c*).

5. The dispenser according to claim 1, wherein while discharging the medium both said first and second valve bodies (25, 25*c;* 26, 26*c*) are enveloped by a shield (36, 36*c*).

6. The dispenser according to claim 1, wherein means (9) are included for dispensing the medium into said outlet duct (14, 14*c*) with an overpressure.

7. A dispenser for discharging media comprising:

a base body (4, 4*a,* 4*b,* 4*c*);

a discharge actuator (8, 8*a,* 8*b,* 8*c*) mounted on said base body;

an outlet duct(14, 14*c*) supplyable with the medium from a conveying chamber (15, 15*c*), said outlet duct (14, 14*c*) ending in a medium outlet (13, 13*c*) and defining an outlet flow direction (11, 11*c*), and valve means including a control valve (20, 20*c*) closing said outlet passage (14, 14*c*) at closing faces (27, 28, 27*c,* 28*c*) which include a first closing face (27, 27*c*) and a second closing face, said control valve (20, 20*c*) including a first valve body (25, 25*c*) with said first closing face (27) and a second valve body (26, 26*c*) with said second closing face (28, 28*c*), said first valve body (25, 25*c*) assuming valve positions including,a closed position, when in said closed position said first valve body (25, 25*c*) sealingly engaging said second closing face (28, 28*c*) under a closing stress and being liftable from said second closing face (28, 28*c*) to open said control valve (20, 20*c*), for opening said control valve (20, 20*c*) said first valve body (25, 25*c*) being displaceable relative to said second closing face (28, 28*c*) substantially codirectional with said outlet flow direction (11, 11*c*), wherein said second closing face (28, 28*c*) is dimensionally rigid when exerted to said closing stress, while opening said control valve (20,

20*c*) said second valve body (26, 26*c*) being retracted from said first closing face (27, 27*c*) and displaced relative to said base body (4, 4*c*).

8. The dispenser according to claim 7, wherein at least one closure (23, 23*c*; 70, 70*c*) is located upstream of said control valve (20, 20*c*), said at least one closure being openable for passing the medium towards said control valve (20, 20*c*).

9. The dispenser according to claim 7, wherein said valve means include a pressure relief closure (23, 23C, 70) opening upon a predetermined pressure of the medium.

10. A dispenser for discharging media comprising:

a base body (4, 4*a*, 4*b*, 4*c*);

discharge actuator (8, 8*a*, 8*b*, 8*c*) mounted on said base body;

an outlet duct (14, 14*c*) supplyable with the medium from a conveying chamber(15, 15*c*), said outlet duct (14, 14*c*) ending in a medium outlet (13, 13*c*) and defining an outlet flow direction (11, 11*c*), and valve means including a control valve (20, 20*c*) closing said outlet passage (14, 14*c*) at closing faces (27, 28, 27*c*, 28*c*) which include a first closing face (27, 27*c*) and a second closing face, said control valve (20, 20*c*) including a first valve body (25, 25*c*) with said first closing face (27) and a second valve body (26, 26*c*) with said second closing face (28, 28*c*), said first valve body (25, 25*c*) assuming valve positions including a closed position, when in said closed Position said first valve body (25, 25*c*) sealingly engaging said second closing face (28, 28*c*) under a closing stress and being liftable from said second closing face (28, 28*c*) to open said control valve (20, 20*c*), for opening said control valve (20, 20*c*) said first valve body (25, 25*c*) being displaceable relative to said second closing face (28, 28*c*) substantially codirectional with said outlet flow direction (11, 11*c*), wherein said second closing face (28, 28*c*) is dimensionally rigid when exerted to said closing stress, said medium outlet including an atomizing means (13, 13*c*) for discharging the medium atomized.

11. A dispenser for discharging media comprising:

a base body (4, 4*a*, 4*b*, 4*c*);

a discharge actuator (8, 8*a*, 8*b*, mounted on said base body;

an outlet duct (14, 14*c*) supplyable with the medium from a conveying chamber (15, 15*c*), said outlet duct (14, 14*c*) ending in a medium outlet (13, 13*c*) and defining an outlet flow direction (11, 11*c*), and valve means including a control valve (20, 20*c*) closing said outlet passage (14, 14*c*) at closing faces (27, 28,27*c*, 28*c*) which include a first closing face (27, 27*c*) and a second closing face, said control valve (20, 20*c*) including a first valve body (25, 25*c*) with said first closing face (27) and a second valve body (26, 26*c*) with said second closing face (28, 28*c*), said first valve body (25, 25*c*) assuming valve positions including a closed position, when in said closed position said first valve body (25, 25*c*) sealingly engaging said second closing face (28, 28*c*) under a closing stress and being liftable from said second closing face (28, 28*c*) to open said control valve (20, 20*c*), for opening said control valve (20–20*c*) said first valve body (25, 25*c*) being displaceably relative to said second-closing face (28, 28*c*) substantially codirectional with said outlet flow direction (11, 11*c*), wherein said second closing face (28, 28*c*) is dimensionally rigid when exerted to said closing stress, said first valve body (25, 25*c*) being axially substantially rigidly connected to at least one of said base body (4, 4*c*), and a boundary (69, 72*c*) of said conveying chamber (15, 15*c*).

12. A dispenser for discharging media comprising:

a base body (4, 4*a*, 4*b*, 4*c*);

a discharge actuator (8, 8*a*, 8*b*, 8*c*) mounted on said base body;

an outlet duct (14, 14*c*) supplyable with the medium from a conveying chamber (15, 15*c*), said outlet duct (14, 14*c*) ending in a medium outlet (13, 13*c*) and defining an outlet flow direction (11, 11*c*), and valve means including a control valve (20, 20*c*) closing said outlet passage (14, 14*c*) at closing faces (27, 28, 27*c*, 28*c*) which include a first closing face (27, 27*c*) and a second closing face, said control valve (20, 20*c*) including a first valve body (25, 25*c*) with said first closing face (27) and a second valve body (26, 26*c*) with said second closing face (28, 28*c*), said first valve body (25, 25*c*) assuming valve positions including a closed position, when in said closed position said first valve body (25, 25*c*) sealingly engaging said second closing face (28, 28*c*) under a closing stress and being liftable from said second closing face (28, 28*c*) to open said control valve (20, 20*c*), for opening said control valve (20, 20*c*) said first valve body (25, 25*c*) being displaceable relative to said second closing face (28, 28*c*) substantially codirectional with said outlet flow direction (11, 11*c*) wherein said second closing face (28, 28*c*) is dimensionally rigid when exerted to said closing stress, said second valve body (26, 26*c*) including a guide member (45, 45*c*) enveloping said first valve body (25, 25*c*) and operably radially tensioned.

13. A dispenser for discharging media comprising:

a base body (4, 4*a*, 4*b*, 4*c*);

a discharge actuator (8, 8*a*, 8*b*, 8*c*) mounted on said base body;

an outlet duct (14, 14*c*) supplyable with the medium from a conveying chamber (15, 15*c*), said outlet duct (14, 14*c*) ending in a medium outlet (13, 13*c*) and defining an outlet flow direction (11, 11*c*), and valve means including a control valve (20, 20*c*) closing said outlet passage (14, 14*c*) at closing faces (27, 28, 27*c*, 28*c*) which include a first closing face (27, 27*c*) and a second closing face, said control valve (20, 20*c*) including a first valve body (25, 25*c*) with said first closing face (27) and a second valve body (26, 26*c*) with said second closing face (28, 28*c*), said first valve body (25, 25*c*) assuming valve positions including a closed position, when in said closed position said first valve body (25, 25*c*) sealingly engaging said second closing face (28, 28*c*) under a closing stress and being liftable from said second closing face (28, 28*c*) to open said control valve (20, 20*c*), for opening said control valve (20, 20*c*) said first valve body (25, 25*c*) being displaceable relative to said second closing face (28, 28*c*) substantially codirectional with said outlet flow direction (11, 11*c*), wherein said second closing face (28, 28*c*) is dimensionally rigid when exerted to said closing-stress, a stop (48, 48*c*) being included for substantially rigidly limiting opening of said control valve (20, 20*c*).

14. The dispenser according to claim 13, wherein said base body (14) is actuated via said stop (48, 48*c*) over a pressurizing path for pressurizing the medium.

15. A dispenser for discharging media comprising:

a base body (4, 4*a*, 4*b*, 4*c*):

a discharge actuator (8, 8*a,* 8*b,* 8*c*) mounted on said base body;

an outlet duct (14, 14*c*) supplyable with the medium from a conveying chamber (15, 15*c*), said outlet duct (14, 14*c*) ending in a medium outlet (13, 13*c*) and defining an outlet flow direction (11, 11*c*), and valve means including a control valve (20, 20*c*) closing said outlet passage (14, 14*c*) at closing faces (27, 28, 27*c,* 28*c*) which include a first closing face (27, 27*c*) and a second closing face, said control valve (20, 20*c*) including a first valve body (25, 25*c*) with said first closing face (27) and a second valve body (26, 26*c*) with said second closing face (28, 28*c*), said first valve body (25, 25*c*) assuming valve positions including a closed position, when in said closed position said first valve body (25, 25*c*) sealingly engaging said second closing face (28, 28*c*) under a closing stress and being liftable from said second closing face (28, 28*c*) to open said control valve (20, 20*c*), for opening said control valve (20, 20*c*) said first valve body (25, 25*c*) being displaceable relative to said second closing face (28, 28*c*) substantially codirectional with said outlet flow direction (11, 11*c*), wherein said second closing face (28, 28*c*) is dimensionally rigid when exerted to said closing stress, said first and second valve bodies (25, 26, 25*c,* 26*c*) being displaceable relative to said base body (4, 4*c*) with said discharge actuator (8, 8*c*) and with a discharge head (40, 40*c*) including said medium outlet (13, 13*c*).

16. A dispenser for discharging media comprising:

a base body (4, 4*a,* 4*b,* 4*c*);

a discharge actuator (8, 8*a,* 8*b,* 8*c*) mounted on said base body;

an outlet duct (14, 14*c*) supplyable with the medium from a conveying chamber (15, 15*c*), said outlet duct (14, 14*c*) ending in a medium outlet (13, 13*c*) and defining an outlet flow direction (11, 11*c*), and valve means including a control valve (20, 20*c*) closing said outlet passage (14, 14*c*) at closing faces (27, 28, 27*c,* 28*c*) which include a first closing face (27, 27*c*) and a second closing face, said control valve (20, 20*c*) including a first valve body (25, 25*c*) with said first closing face (27) and a second valve body (26, 26*c*) with said second closing face (28, 28*c*), said first valve body (25, 25*c*) assuming valve positions including a closed-position, when in said closed position said first valve body (25, 25*c*) sealingly engaging said second closing face (28, 28*c*) under a closing stress and being liftable from said second closing face (28, 28*c*) to open said control valve (20, 20*c*), for opening said control valve (20, 20*c*) said first valve body (25, 25*c*) being displaceable relative to said second closing face (28, 28*c*) substantially codirectional with said outlet flow direction (11, 11*c*), wherein said second closing face (28, 28*c*) is dimensionally rigid when exerted to said closing stress, a discharge head (40, 40*c*) being included and including said medium outlet (13, 13*c*), said base body (4) extending inside said discharge head (40, 40*c*) substantially codirectional with said outlet flow direction (11, 11*c*).

17. A dispenser for discharging media comprising:

a base body (4, 4*a,* 4*b,* 4*c*);

a discharge actuator (8, 8*a,* 8*b,* 8*c*) mounted on said base body;

an outlet duct (14, 14*c*) supplyable with the medium from a conveying chamber (15, 15*c*), said outlet duct (14, 14*c*) ending in a medium outlet (13, 13*c*) and defining an outlet flow direction (11, 11*c*) and valve means including a control valve (20, 20*c*) closing said outlet passage (14, 14*c*) at closing faces (27, 28, 27*c,* 28*c*) which include a first closing face (27, 27*c*) and a second closing face, said control valve (20, 20*c*) including a first valve body (25, 25*c*) with said first closing face (27) and a second valve body (26, 26*c*) with said second closing face (28, 28*c*), said first valve body (25, 25*c*) assuming valve positions including a closed position, when in said closed position said first valve body (25, 25*c*) sealingly engaging said second closing face (28, 28*c*) under a closing stress and being liftable from said second closing face (28, 28*c*) to open said control valve (20, 20*c*), for opening said control valve (20, 20*c*) said first valve body (25, 25*c*) being displaceable relative to said second closing face (28, 28*c*) substantially codirectional with said outlet flow direction (11, 11*c*), wherein said second closing face (28, 28*c*) is dimensionally rigid when exerted to said closing stress, means (9) being included for dispensing the medium into said outlet duct (14, 14*c*) with an overpressure, said overpressure means (9) including a pressurizing cylinder (64) displaceable with said discharge actuator (8) and commonly with said base body (4) and said medium outlet (23) relative to a support (5, 5*c*), said support (5) including a shaft (17, 85) extending away from said pressurizing cylinder (64).

18. A dispenser for discharging media comprising:

a base body (4, 4*a,* 4*b,* 4*c*);

a discharge actuator (8, 8*a,* 8*b,* 8*c*) mounted on said base body;

an outlet duct (14, 14*c*) supplyable with the medium from a conveying chamber (15, 15*c*), said outlet duct (14, 14*c*) ending in a medium outlet (13, 13*c*) and defining an outlet flow direction (11, 11*c*), and valve means including a control valve (20, 20*c*) closing said outlet passage (14, 14*c*) at closing faces(27, 28, 27*c,* 28*c*) which include a first closing face (27, 27*c*) and a second closing face, said control valve (20, 20*c*) including a first valve body (25, 25*c*) with said first closing face (27) and a second valve body (26, 26*c*) with said second closing face (28, 28*c*), said first valve body (25, 25*c*) assuming valve positions including a closed position, when in said closed position said first valve body (25, 25*c*) sealingly engaging said second closing face (28, 28*c*) under a closing stress and being liftable from said second closing face (28, 28*c*) to open said control valve (20, 20*c*), for opening said control valve (20, 20*c*) said first valve body (25, 25*c*) being displaceable relative to said second closing face (28, 28*c*) substantially codirectional with said outlet flow direction (11, 11*c*), wherein said second closing face (28, 28*c*) is dimensionally rigid when exerted to said closing stress, a prechamber (6, 16) for the medium being included, said prechamber (6, 16) being located upstream of said conveying chamber (15) and delivering dosed amounts of the medium to said conveying chamber (15) via flow control means (70).

19. A dispenser for discharging media comprising:

a base body (4, 4*a,* 4*b,* 4*c*);

a discharge actuator (8, 8*a,* 8*b,* 8*c*) mounted on said base body;

an outlet duct (14, 14*c*) supplyable with the medium from a conveying chamber (15, 15*c*), said outlet duct (14, 14*c*) ending in a medium outlet (13, 13*c*) and defining an outlet flow direction (11, 11*c*), and valve means including a control valve (20, 20*c*) closing said-outlet passage (14, 14*c*) at closing faces (27, 28, 27*c*, 28*c*) which include a first closing face (27, 27*c*) and a second closing face, said control valve (20, 20*c*) including a first valve body (25, 25*c*) with said first closing face (27) and a second valve body (26, 26*c*) with said second closing face (28, 28*c*), said first valve body (25, 25*c*) assuming valve positions including a closed position when in said closed position said first valve body (25, 25*c*) sealingly engaging said second closing face (28, 28*c*) under a closing stress and being liftable from said second closing face (28, 28*c*) to open said control valve (20, 20*c*), for opening said control valve (20, 20*c*) said first valve body (25, 25*c*) being displaceable relative to said second closing face (28, 28*c*) substantially co-directional with said outlet flow direction (11, 11*c*), wherein said second closing face (28, 28*c*) is dimensionally rigid when exerted to said closing stress, means for refilling said conveying chamber (15, 15*c*) from a reservoir (6) and venting means (18, 18*c*) for venting the reservoir (6) through said base base body (4, 40) being included, said venting means (18, 18*c*) including at least one of germicides for sterilizing the medium, a germicidal filter (80, 80*c*) for sterilizing said venting means (18, 18*c*), and a vent valve (24, 24*c*).

20. A dispenser for discharging media comprising:

a base body (4, 4*a*, 4*b*, 4*c*);

a discharge actuator (8, 8*a*, 8*b*, 8) mounted on said base body;

an outlet duct (14, 14*c*) supplyable with the medium from a conveying chamber (15, 15*c*), said outlet duct (14, 14*c*) ending in a medium outlet (13, 13*c*) and defining an outlet flow direction (11, 11*c*), and valve means including a control valve (20, 20*c*) closing said outlet passage (14, 14*c*) at closing faces (27, 28, 27*c*, 28*c*) which include a first closing face (27, 27*c*) and a second closing face, said control valve (20, 20*c*) including a first valve body (25, 25*c*) with said first closing face (27) and a second valve body (26, 26*c*) with said second closing face (28, 28*c*), said first valve body (25, 25*c*) assuming valve positions including a closed position, when in said closed position said first valve body (25, 25*c*) sealingly engaging said second closing face (28, 28*c*) under a closing stress and being liftable from said second closing face (28, 28*c*) to open said control valve (20, 20*c*), for opening said control valve (20, 20*c*) said first valve body (25, 25*c*) being displaceable relative to said second closing face (28, 28*c*) substantially codirectional with said outlet flow direction (11, 11*c*), wherein said second closing face (28, 28*c*) is dimensionally rigid when exerted to said closing stress, a connector (86) for connecting said dispenser (1) to a reservoir (6) and a sealing flange (7) attached to said connector (86) being included, said sealing flange (7) including at least one of a vent duct (81) for venting the reservoir (6), and a connecting member (85) for connecting said sealing flange (7) to a riser duct (17).

21. A dispenser for discharging media comprising:

a base body (4, 4*a*, 4*b*, 4*c*);

a discharge actuator (8, 8*a*, 8*b*, 8*c*) mounted on said base body;

an outlet duct (14, 14*c*) supplyable with the medium from a conveying chamber (15, 15*c*), said outlet duct (14, 14*c*) ending in a medium outlet (13, 11*c*) and defining an outlet flow direction (11, 11*c*) and valve means including a control valve (20, 20*c*) closing said outlet passage (14, 14*c*) at closing faces (27, 28, 27*c*, 28*c*) which include a first closing face (27, 27*c*) and a second closing face, said control valve (20, 20*c*) including a first valve body (25, 25*c*) with said first closing face (27) and a second valve body (26, 26*c*) with said second closing face (28, 28*c*), said first valve body (25, 25*c*) assuming valve positions including a closed position, when in said closed position said first valve body (25, 25*c*) sealingly engaging said second closing face (28, 28*c*) under a closing stress and being liftable from said second closing face (28, 28*c*) to open said control valve (20, 20*c*), for opening said control valve (20, 20*c*) said first valve body (25, 25*c*) being displaceable relative to said second closing face (28, 28*c*) substantially codirectional with said outlet flow direction (11, 11*c*), wherein said second closing face (28, 28*c*) is dimensionally rigid when exerted to said closing stress, said first valve body (25, 25*c*) including a valve head (32) and a valve shaft (33) carrying said valve head (32), said valve head (32) including end faces (27, 51) which include said first closing face (27) circumferentially connecting to said valve shaft (33) and a second end face (51) remote from said first closing face (27), at least one of said end faces (27, 51) being non-spherical.

22. A dispenser for discharging media comprising:

base body (4, 4*a*, 4*b*, 4*c*);

discharge actuator (8, 8*a*, 8*b*, 8*c*) mounted on said base body:

an outlet duct (14, 14*c*) supplyable with the medium from a conveying chamber (15, 15*c*), said outlet duct (14, 14*c*) ending in a medium outlet (13, 13*c*) and defining an outlet flow direction (11, 11*c*), and valve means including a control valve (20, 20*c*) closing said outlet passage (14, 14*c*) at closing faces (27, 28, 27*c*, 28*c*) which include a first closing face (27, 27*c*) and a second closing face, said control valve (20, 20*c*) including a first valve body (25, 25*c*) with said first closing face (27) and a second valve body (26, 26*c*) with said second closing face (28, 28*c*), said first valve body (25, 25*c*) assuming valve positions including a closed position, when in said closed position said first valve body (25, 25*c*) sealingly engaging said second closing face (28, 28*c*) under a closing stress and being liftable from said second closing face (28, 28*c*) to open said control valve (20, 20*c*), for opening said control valve (20, 20*c*) said first valve body (25, 25*c*) being displaceable relative to said second closing face (28, 28*c*) substantially codirectional with said outlet flow directional (11, 11*c*), wherein said second closing face (28, 28*c*) is dimensionally rigid when exerted to said closing stress, said first valve body (25, 25*c*) including a valve head (32) including said first closing face (27, 27*c*) and an end face (51, 51*c*) remote from said first closing face (27, 27*c*), said first closing face and said end face (51, 51*c*) being interconnected by an annular edge (52, 52*c*).

23. A dispenser for discharging media comprising:

a base body (4, 4*a*, 4*b*, 4*c*);

a discharge actuator (8, 8*a*, 8*b*, 8*c*) mounted on said base body;

an outlet duct (14, 14*c*) supplyable with the medium from a conveying chamber (15, 15*c*), said outlet duct (14,

14*c*) ending in a medium outlet (13, 13*c*) and defining an outlet flow direction (11, 11*c*), and valve means including a control valve (20, 20*c*) closing said outlet passage (14, 14*c*) at closing faces (27, 28, 27*c*, 28*c*) which include a first closing face (27, 27*c*) and a second closing face, said-control valve (20, 20*c*) including a first valve body (25, 25*c*) with said first closing face (27) and a second valve body (26, 26*c*) with said second closing face (28, 28*c*) said first valve body (25, 25*c*) assuming valve positions including a closed position, when in said closed position said first valve body (25, 25*c*) sealingly engaging said second closing face (28, 28*c*) under a closing stress and being liftable from said second closing face (28, 28*c*) to open said control valve (20, 20*c*), for opening said control valve (20, 20*c*) said first valve body (25, 25*c*) being displaceable relative to said second closing face (28, 28*c*) substantially codirectional with said outlet flow direction (11, 11*c*), wherein said second closing face (28, 28*c*) is dimensionally rigid when exerted to said closing-stress, a filter, and means being included for crushing out said filter (80).

24. A dispenser for discharging media comprising:

a base body (4, 4*a*, 4*b*, 4*c*);

a discharge actuator (8, 8*a*, 8*b*, 8*c*) mounted for movement on said base body;

an outlet duct (14, 14*c*) supplyable with the medium from a conveying chamber (15, 15*c*), said outlet duct (14, 14*c*) ending in a medium outlet (13, 13*c*) and defining an outlet flow direction (11, 11*c*), and a discharge head (40, 40*c*) separate from said discharge actuator (8, 8*a*, 8*b*, 8*c*), said discharge head including said medium outlet (13, 13*c*), wherein said base body (4) extends inside said discharge head (40, 40*c*) substantially codirectional with said outlet flow direction (11, 11*c*).

25. A dispenser for discharging media comprising:

a base body (4, 4*a*, 4*b*, 4*c*);

a discharge actuator (8, 8*a*, 8*b*, 8*c*) mounted on said base body;

an outlet duct (14, 14*c*) supplyable with the medium from a conveying chamber (15, 15*c*), said outlet duct (14, 14*c*) ending in a medium outlet (13, 13*c*) and defining an outlet flow direction (11, 11*c*), and means (9) for dispensing the medium into said outlet duct (14, 14*c*) with an overpressure, wherein said overpressure means (9) include a pressurizing cylinder (64) displaceable with said discharge actuator (8) and commonly with said base body (4) and said medium outlet (23) relative to a support (5, 5*c*), said support (5, 5*c*) including a shaft (17, 85) extending away from said pressurizing cylinder (64).

26. A dispenser for discharging media comprising:

a base body (4, 4*a*, 4*b*, 4*c*);

a discharge actuator (8, 8*a*, 8*b*, 8*c*) mounted on said base body;

an outlet duct (14, 14*c*) for receiving the medium from a conveying chamber (15, 15*c*), said outlet duct (14, 14*c*) ending in a medium outlet (13, 13*c*) and defining an outlet flow direction (11, 11*c*), and means for refilling said conveying chamber (15, 15*c*) from a reservoir (6), wherein venting means (18, 18*c*) are included for venting the reservoir (6) through said base body (4, 4*c*), said venting means (18, 18*c*) including at least one of germicides for sterilizing the medium, a germicidal filter (80, 80*c*) for sterilizing said venting means (18, 18*c*), and a vent valve (24, 24*c*).

27. A dispenser for discharging media comprising: a base body (4, 4*a*, 4*b*, 4*c*);

a discharge actuator (8, 8*a*, 8*b*, 8*c*) mounted on said base body;

an outlet duct (14, 14*c*) for receiving the medium from a conveying chamber (15, 15*c*), said outlet duct (14, 14*c*) ending in a medium outlet (13, 13*c*) and defining an outlet flow direction (11, 11*c*), and a connector (86) for connecting said dispenser (1) to a reservoir (6), wherein a sealing flange (7) is included and attached to said connector (86), said sealing flange (7) including at least one of a vent duct (81) for venting the reservoir (6), and a connecting member (85), comprising a component separate from said sealing flange (7), for connecting said sealing flange (7) to a riser duct (17).

28. A dispenser for discharging media comprising:

a base body (4, 4*a*, 4*b*, 4*c*);

a discharge actuator (8, 8*a*, 8*b*, 8*c*) mounted on said base body;

an outlet duct (14, 14*c*) for receiving the medium from a conveying chamber (15, 15*c*), said outlet duct (14, 14*c*) ending in a medium outlet (13, 13*c*) and defining an outlet flow direction (11, 11*c*), and a droplet former (50) for dispensing the medium by a droplet adhering to said droplet former (50), said droplet former (50) including a former head including a first face (27, 27*c*) and an end face (51, 51*c*) remote from said first face (27, 27*c*), wherein said first face (27, 27*c*) and said end face (51, 51*c*) are interconnected by an annular edge (52, 52*c*).

29. A dispenser for discharging media comprising:

a base body (4, 4*a*, 4*b*, 4*c*);

a discharge actuator (8, 8*a*, 8*b*, 8*c*) mounted on said base body;

an outlet duct (14, 14*c*) for receiving the medium from a conveying chamber (15, 15*c*), said outlet duct (14, 14*c*) ending in a medium outlet (13, 13*c*) and defining an outlet flow direction (11, 11*c*), and a filter (80), wherein means are included for crushing out said filter (80).

* * * * *